UNITED STATES PATENT OFFICE.

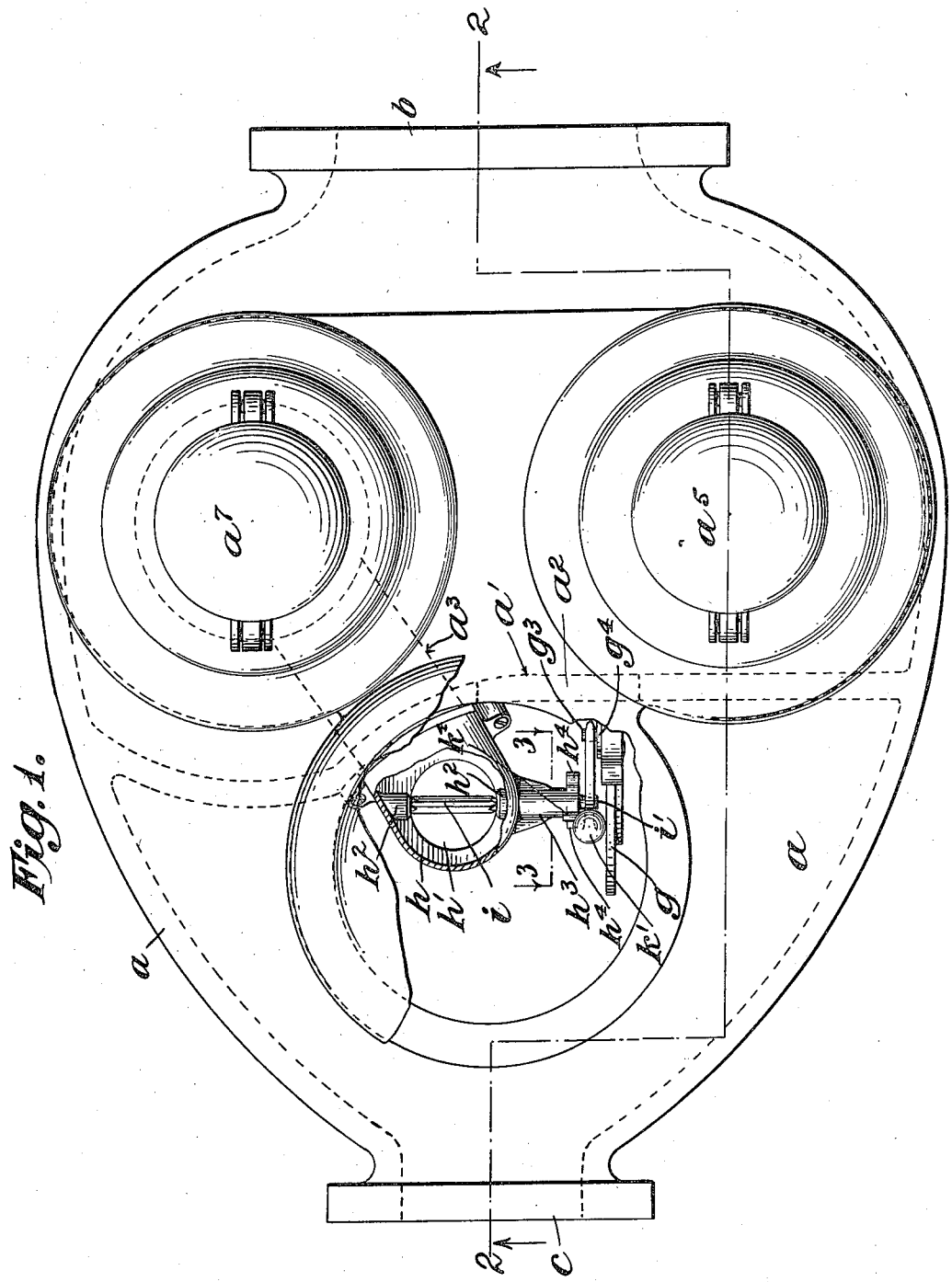

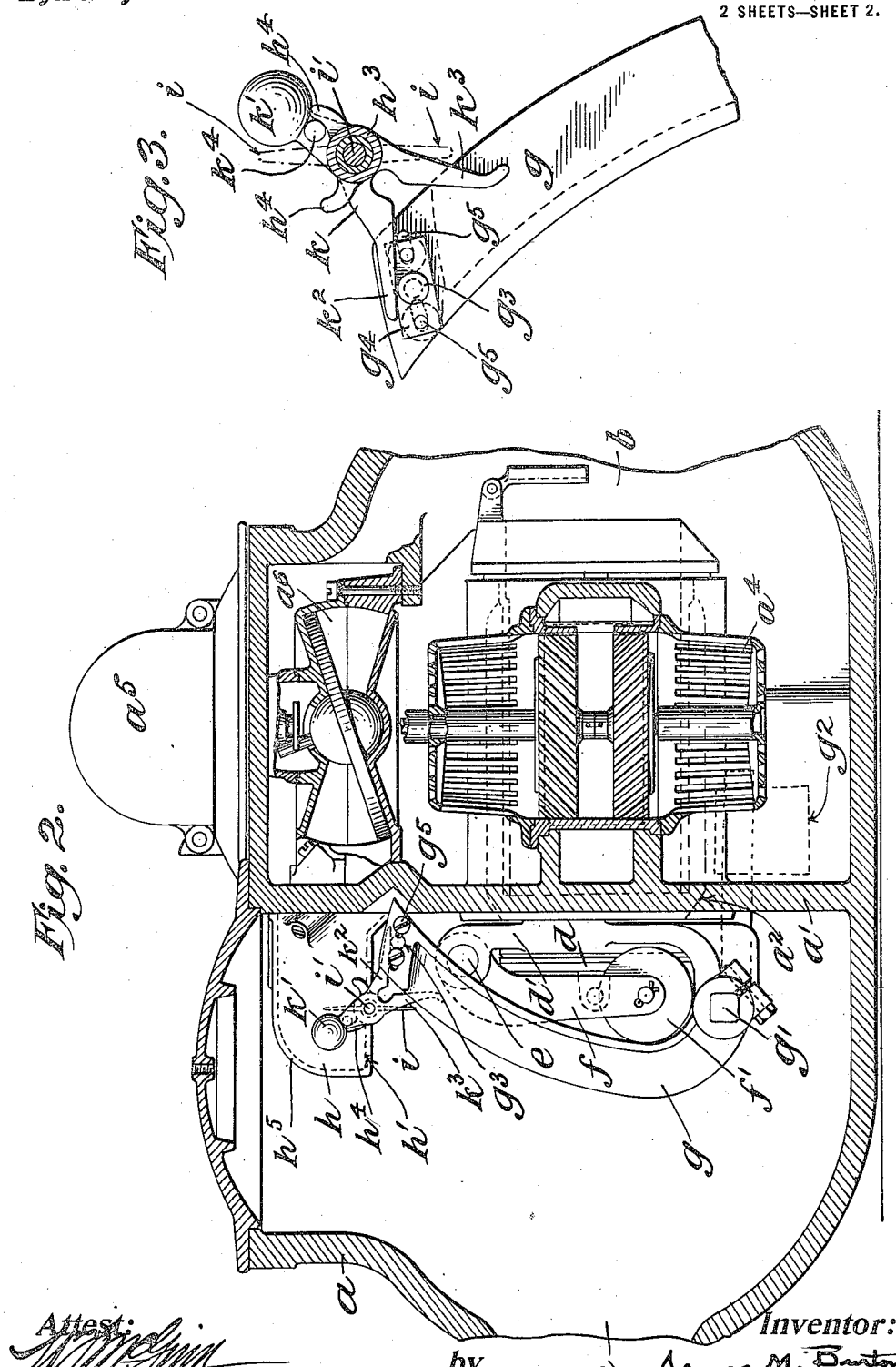

JAMES M. BURTON, OF NEW YORK, N. Y., ASSIGNOR TO NEPTUNE METER COMPANY, OF NEW YORK, N. Y., A CORPORATION OF NEW JERSEY.

WATER-METER.

1,142,141.  Specification of Letters Patent.  Patented June 8, 1915.

Application filed August 28, 1914. Serial No. 859,017.

*To all whom it may concern:*

Be it known that I, JAMES M. BURTON, a citizen of the United States, residing in Long Island City, borough of Queens of the city of New York, in the county of Queens, in the State of New York, have invented certain new and useful Improvements in Water-Meters, of which the following is a specification, reference being had to the accompanying drawings, forming a part hereof.

This invention relates to water meters of the general character shown and described in Letters Patent of the United States No. 1,093,571, dated April 14, 1914, in which are provided a high-duty valve and a low-duty valve controlling passages in which are disposed respectively devices for registering separately low-duty flow and high-duty flow and in which the valves controlling such passages are interconnected so that the opening of the high-duty valve results in the closing of the low-duty valve and vice versa.

It is, of course, the primary object in meters of this character to provide devices whereby the change from high-duty conditions to low-duty conditions is made without loss of accuracy in the registration of the metering devices.

The present invention has for its principal object the simplification of the structure for effecting the change from high-duty conditions to low-duty conditions while preserving that accuracy of registration which is essential.

In accordance with the invention the high-duty valve is connected operatively with the low-duty valve in such manner that the latter is connected directly to the former and is closed when the high-duty valve is opened, and the low-duty valve is opened by the closing movement of the high-duty valve, such opening being effected, either in part or wholly, before the high-duty valve has seated, thereby insuring equalization of pressure on the opposite sides of the high-duty valve and facilitating the final closing movement.

In carrying out the invention, only a single low-duty valve is employed and this valve is disposed in a housing of novel outline, the walls thereof being of such configuration as to impede the low-duty flow when the change of conditions is being effected and thereby cause an immediate diversion of flow from the low-duty passage to the high-duty passage. Through the restriction of the low-duty flow under the circumstances indicated, and the direct interconnection of the low-duty valve and the high-duty valve, change from low-duty conditions to high-duty conditions is effected in the improved meter with a minimum loss of accuracy while the devices for permitting such change are much simpler in structure than any heretofore employed.

The invention will be described more particularly with reference to the accompanying drawings in which it is illustrated and in which—

Figure 1 is a top view partly in horizontal section of a meter which embodies the invention. Fig. 2 is a view in vertical section on the irregular plane indicated by the broken line 2—2 of Fig. 1, looking in the direction of the arrows, some parts being shown in elevation. Fig. 3 is a fragmentary view on a somewhat enlarged scale taken along the plane indicated by the line 3—3 of Fig. 1 (looking in the direction of the arrows) and showing particularly the disposition of the cam arm with respect to the coöperating arm on the shaft of the low-duty valve.

The meter casing $a$ is shown as provided with the usual inlet $b$ and outlet $c$ and a transverse partition $a'$ therein which is formed as usual with a high-duty orifice $a^2$, preferably in line with the inlet and outlet, and with a low-duty orifice indicated generally by the dotted lines $a^3$. The high-duty metering devices, which may be of the inferential type, are indicated generally by the reference character $a^4$ and are disposed, as usual, well to one side of the path of high-duty flow and are connected with suitable registering mechanism, indicated at $a^5$. Part of the water flows directly into the high-duty passage at the inlet $a^z$ and part through the cages $a^4$ and turbine wheels $a^t$. The inlet $a^z$ may have supported in line therewith a weighted flap valve $a^x$ for the usual purpose. The low-duty metering device, indicated generally at $a^6$ is, on the other hand, preferably located well to the other side of the path of high-duty flow and above the same and may comprise a positive metering device, such as a disk meter. This meter is also connected to suitable registering mechanism such as $a^7$, for registering the low-duty flow. During normal operation of the meter the low-duty metering devices are in operation and the water passes by the disk meter $a^6$ and through the low-duty orifice $a^3$ into the outlet channel $c$. During high-duty conditions, as in case of a fire, the bulk of the water flows directly between the inlet $b$ and the outlet $c$, through the high-duty orifice $a^2$, only a small proportion of the water flowing through the inferential meter $a^4$ and serving to register, proportionally, the amount of such high-duty flow.

It is with the control of the valves disposed in the low-duty passage $a^3$ and the high-duty orifice $a^2$, respectively, and the mechanism by which these valves are connected operatively, that the present invention is concerned. As indicated in Fig. 2, the orifice $a^2$ is arranged to have seated therein the high-duty valve $d$, the latter being of any approved form, but preferably embodying the features of construction referred to in connection with such a high-duty valve in the patent hereinbefore mentioned. This valve $d$ may be suspended from a supporting arm $d'$ pivotally carried on a shaft $e$ which may be mounted in bearings carried on the casing $a$. Fixed to this shaft $e$ is also a depending arm $f$ to the lower end of which is secured a roller $f'$ the tread of which is arranged to run along the face of a cam arm $g$ which is fixed to a supporting shaft $g'$ to which is also secured a counterweight $g^2$. Normally, the action of the weight $g^2$ is to press the arm $g$ inwardly toward the valve $d$, so that the latter is maintained on its seat, through the pressure of the arm $g$ on the roller $f'$ and arm $f$.

Referring now to the low-duty passage $a^3$ it will be seen that such passage terminates in a casing $h$, the floor of which is substantially flat and is provided with an opening $h'$ controlled by a butterfly valve $i$, rotatably mounted on a shaft $i'$. The shaft $i'$ of the valve $i$ is extended beyond the casing $h$ and has secured on its projected end an arm $k$, one end of which is weighted as at $k'$ and the other end of which is split to form two separate legs $k^2$ and $k^3$ the inner faces of which are adapted to be engaged by a pin $g^3$ carried on an adjustable plate $g^4$ secured through slot and stud connections $g^5$ to the upper end of the cam arm $g$. It is to be noted that the shaft $i'$ of the butterfly valve $i$ finds bearings in suitable sleeves $h^2$ cast integrally on the inner face of the casing $h$ and in an outwardly projecting sleeve $h^3$ also preferably integral with said casing. The outer bearing $h^3$ may be provided with ears $h^4$ arranged in the path of a pin $k^4$ fixed on the arm $k$, whereby the amplitude of oscillation of the arm $k$ with the shaft $i'$, is determined.

It will now be evident that during normal low-duty conditions, the butterfly valve $i$ will be maintained in its open position by reason of the action of the weight $k'$ on the shaft $i'$ and the engagement of the pin $g^3$ with one of the legs $k^2$ of the arm $k$. At this time, the low-duty flow will be through the disk meter $a^6$, the low-duty passage $a^3$, the opening $h'$ in the casing $h$ and out through the outlet $c$. If now, conditions change so that excessive pressure serves to open the high-duty valve $d$ and permit a free flow through the meter casing, such movement of the valve $d$ will cause the roller $f'$ to ride up the face of the cam arm $g$ and swing the upper end thereof outwardly from the partition $a'$ until the pin $g^3$ engages the other leg $k^3$ of the arm $k$. Continued movement of the pin $g^3$ will serve to rock the arm $k$ with the shaft $i'$ and, with the assistance of the weight $k'$, cause the rapid seating of the valve $i$ on the opening $h'$. It will be understood that the parts are maintained in this high-duty condition by the differential pressure of the water. When this differential pressure falls below a predetermined point, however, the weight $g^2$ will become effective to close the valve $d$ through action of the cam arm $g$ on the roller $f'$. Such closing movement will bring the pin $g^3$ (formerly in engagement with the leg $k^3$) into engagement with the leg $k^2$ so as to effect, with the aid of the weight $k'$, a rapid unseating of the valve $i$ and a consequent opening of the low-duty orifice $h'$. It is of particular importance to note that this opening of the valve $i$ is brought about prior to the final closing of the high-duty valve $d$ thereby affording a means of communication between the two sides of the partition $a'$ and insuring a substantial equalization of pressure on the two faces of the valve $d$ and thereby facilitating its final closing movement.

In considering the operation of the improved meter certain characteristics of the valve housing $h$ should be noted. The end wall of this housing $h$, indicated generally by the character $h^5$ is spherical on the inner side so as to have a tendency to direct the flow of water downward through the aperture $h'$, although this inner wall, generally speaking, constitutes an abrupt abutment tending to interfere with the free flow of water. When the valve $d$ is open the restriction of the flow caused by the peculiarly formed casing $h$ is so great as to cause an immediate diversion of water from its path through the low-duty meter $a^6$ to the high-duty meter $a^4$, the net result being that there is no substantial loss in the accuracy of registration of the total flow. This diversion of water during the opening of the high-duty valve $d$ is of especial importance inasmuch as the low-duty valve $i$ may remain open momentarily after such opening of the high-duty valve. As has been pointed out before, however, during the closing movement of the high-duty valve $d$, the low-duty valve *i* is open momentarily before the valve *d* seats to permit an equalization of the pressures on the two sides of the valve *d*. The coöperation of the housing *h* with the connecting devices between the high-duty valve and the low-duty valve is such that, whether one valve or the other be opening or closing, an efficient and quick change from one metering mechanism to the other, is assured.

While the improved meter has been constructed with a view to simplifying the parts thereof and rendering its operation highly efficient with such parts, it will be understood that changes in the structure of certain of the elements and rearrangements thereof may be made without departing from the spirit of this invention provided such changes and rearrangements fall within the scope of the appended claims.

I claim as my invention:—

1. A meter comprising a casing having a high duty passage, a high duty valve to control the same, a low duty passage, a single valve constituting the sole control for the low duty passage, an arm carried on the low duty valve and an arm independent of the first named arm moving with the high duty valve and carrying a member unconnected with the first named arm but arranged to coöperate therewith, whereby the low duty valve is closed when the high duty valve is opened and vice versa.

2. A meter comprising a casing having a high-duty passage, a high-duty valve to control the same, a low-duty passage in said casing, a single-bladed butterfly valve disposed in said low-duty passage and constituting the sole control of the flow of water therethrough and having its shaft extended beyond the low-duty passage, a bifurcated arm secured to the projecting shaft of the butterfly valve and an arm moving with the high-duty valve and having a pin to engage the forks of the bifurcated arm to move the low-duty valve to closed position when the high-duty valve is opened, and vice versa.

3. A meter comprising a casing having a high-duty passage, a high-duty valve to control the same, a low-duty passage in said casing, a butterfly valve disposed in the low-duty passage and constituting the sole control of the flow of water therethrough, a housing for the low-duty valve, a shaft for the valve journaled in said housing and having one end projected beyond the housing, a bifurcated arm fixed to the projecting end of said shaft and weighted to assist in the opening and closing movements of the low-duty valve, coöperating means carried by the bifurcated arm and the housing for limiting the amplitude of the oscillations of the shaft of the low-duty valve, and an arm movable with the high-duty valve and provided with a pin adapted to engage the forks of the bifurcated arm to close the low-duty valve when the high-duty valve is opened, and vice versa.

4. A meter casing having a high-duty passage, a high-duty valve to control the same, a low-duty passage in the casing, a single valve disposed in said low-duty passage to control the flow of water therethrough, operative connections between the low-duty valve and the high-duty valve whereby the low-duty valve is closed when the high-duty valve is opened and vice versa, and a valve housing for the low-duty valve having a spheroidal wall in such relation to the low-duty valve as to tend to restrict the flow of water through the low-duty passage at the time of change from high-duty flow to low-duty flow, to insure an immediate diversion of the flow from one passage to the other upon change of conditions.

This specification signed and witnessed this 25 day of August A. D., 1914.

JAMES M. BURTON.

Signed in the presence of—
A. B. RICKETTS,
A. C. KOOPMAN.